US010908381B2

(12) United States Patent
Tsujie

(10) Patent No.: US 10,908,381 B2
(45) Date of Patent: Feb. 2, 2021

(54) TITANIUM COPPER FOIL HAVING PLATED LAYER

(71) Applicant: JX Nippon Mining & Metals Corporation, Tokyo (JP)

(72) Inventor: Kenta Tsujie, Kanagawa (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 639 days.

(21) Appl. No.: 15/473,696

(22) Filed: Mar. 30, 2017

(65) Prior Publication Data
US 2017/0285294 A1 Oct. 5, 2017

(30) Foreign Application Priority Data

Mar. 31, 2016 (JP) ................. 2016-073341

(51) Int. Cl.
| | | |
|---|---|---|
| *G02B 7/02* | (2006.01) | |
| *C25D 5/10* | (2006.01) | |
| *G02B 7/09* | (2006.01) | |
| *B32B 15/01* | (2006.01) | |
| *C22C 9/00* | (2006.01) | |
| *C25D 3/30* | (2006.01) | |
| *C25D 7/06* | (2006.01) | |
| *G02B 7/10* | (2006.01) | |

(Continued)

(52) U.S. Cl.
CPC ............. *G02B 7/026* (2013.01); *B32B 15/01* (2013.01); *C22C 9/00* (2013.01); *C25D 3/30* (2013.01);
(Continued)

(58) Field of Classification Search
CPC .. G02B 7/026; C22C 9/00; C25D 3/30; C25D 5/10; C25D 7/0614; B23K 2103/00;
(Continued)

(56) References Cited

U.S. PATENT DOCUMENTS 4,599,119 A * 7/1986 Ikushima .................. C22C 9/00
148/411
5,423,220 A * 6/1995 Finsterwald .......... B06B 1/0622
310/322

(Continued)

FOREIGN PATENT DOCUMENTS

| JP | 2004-280031 A | 10/2004 |
|---|---|---|
| JP | 2009-097040 A | 5/2009 |

(Continued)

OTHER PUBLICATIONS

Office Action in KR Application No. 10-2017-0040841 dated Feb. 5, 2018, with Abridged Machine Translation, 11 pages.

(Continued)

*Primary Examiner* — Clayton E. LaBalle
*Assistant Examiner* — Dennis Hancock
(74) *Attorney, Agent, or Firm* — Marshall, Gerstein & Borun LLP

(57) ABSTRACT

The present invention provides a titanium copper foil having improved adhesion to solder and higher resistance to discoloration due to a high temperature and high humidity environment, an acid solution or an alkaline solution, and as well as having improved etching processability. The present invention provides a titanium copper foil comprising a base metal, the base metal having a composition containing Ti of from 1.5 to 5.0% by mass, the balance being copper and inevitable impurities, and having a thickness of from 0.018 to 0.1 mm, wherein the titanium copper foil has a plated layer in which an underlying Cu plated layer and a Sn plated layer have been laminated in this order on a surface of the base metal, and has an adhesive strength of 1 N or more as measured by a solder adhesive strength test according to the definition in the specification.

18 Claims, 3 Drawing Sheets

(51) Int. Cl.
*B23K 101/36* (2006.01)
*C25D 3/38* (2006.01)
*B23K 1/00* (2006.01)

(52) U.S. Cl.
CPC .............. *C25D 5/10* (2013.01); *C25D 7/0614* (2013.01); *G02B 7/09* (2013.01); *G02B 7/10* (2013.01); *B23K 1/0016* (2013.01); *B23K 2101/36* (2018.08); *C25D 3/38* (2013.01)

(58) Field of Classification Search
CPC ............ B23K 2103/12; B23K 2103/14; B23K 2103/16; B23K 2103/166
USPC ......................................... 428/615, 675, 922
See application file for complete search history.

(56) References Cited

U.S. PATENT DOCUMENTS

| 6,720,499 | B2* | 4/2004 | Bokisa | ................ C23C 18/1651 174/256 |
|---|---|---|---|---|
| 10,495,840 | B2* | 12/2019 | Tsujie | ....................... C22C 9/05 |
| 2001/0054690 | A1* | 12/2001 | Shimada | ................. B82Y 10/00 250/306 |
| 2013/0004793 | A1* | 1/2013 | Kuwagaki | ............. B24B 37/044 428/675 |
| 2016/0326611 | A1* | 11/2016 | Horie | ..................... H01B 1/026 |

FOREIGN PATENT DOCUMENTS

| JP | 2009-115895 A | 5/2009 |
|---|---|---|
| JP | 2014-037613 A | 2/2014 |
| JP | 2014-080670 A | 5/2014 |
| JP | 2015061936 A | 4/2015 |
| KR | 20100118147 A | 11/2010 |

OTHER PUBLICATIONS

Office Action for JP Application No. JP2016-073341 dated Dec. 5, 2017 (English Translation).

* cited by examiner

[FIG.1]
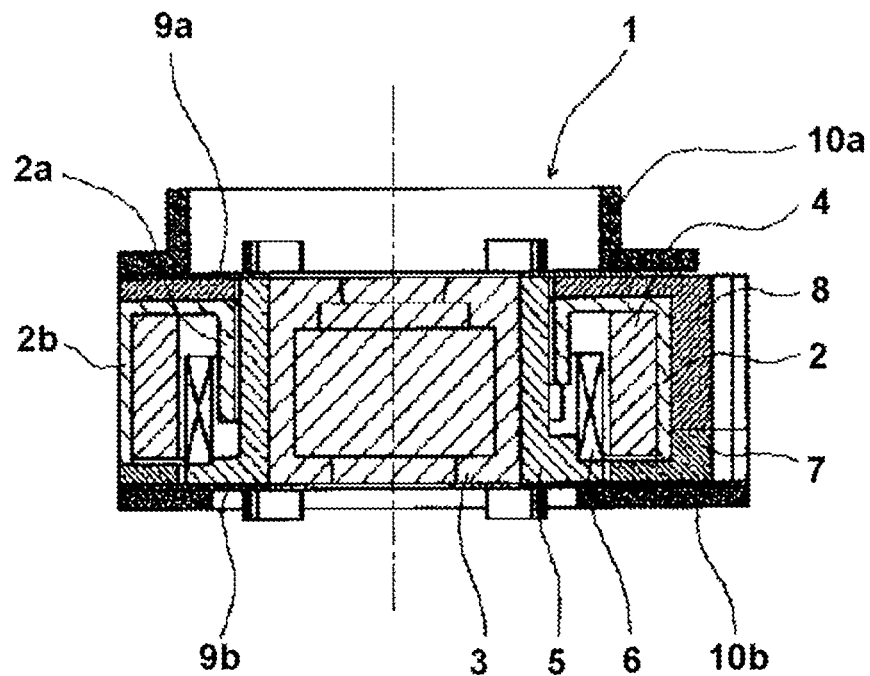

[FIG.2]
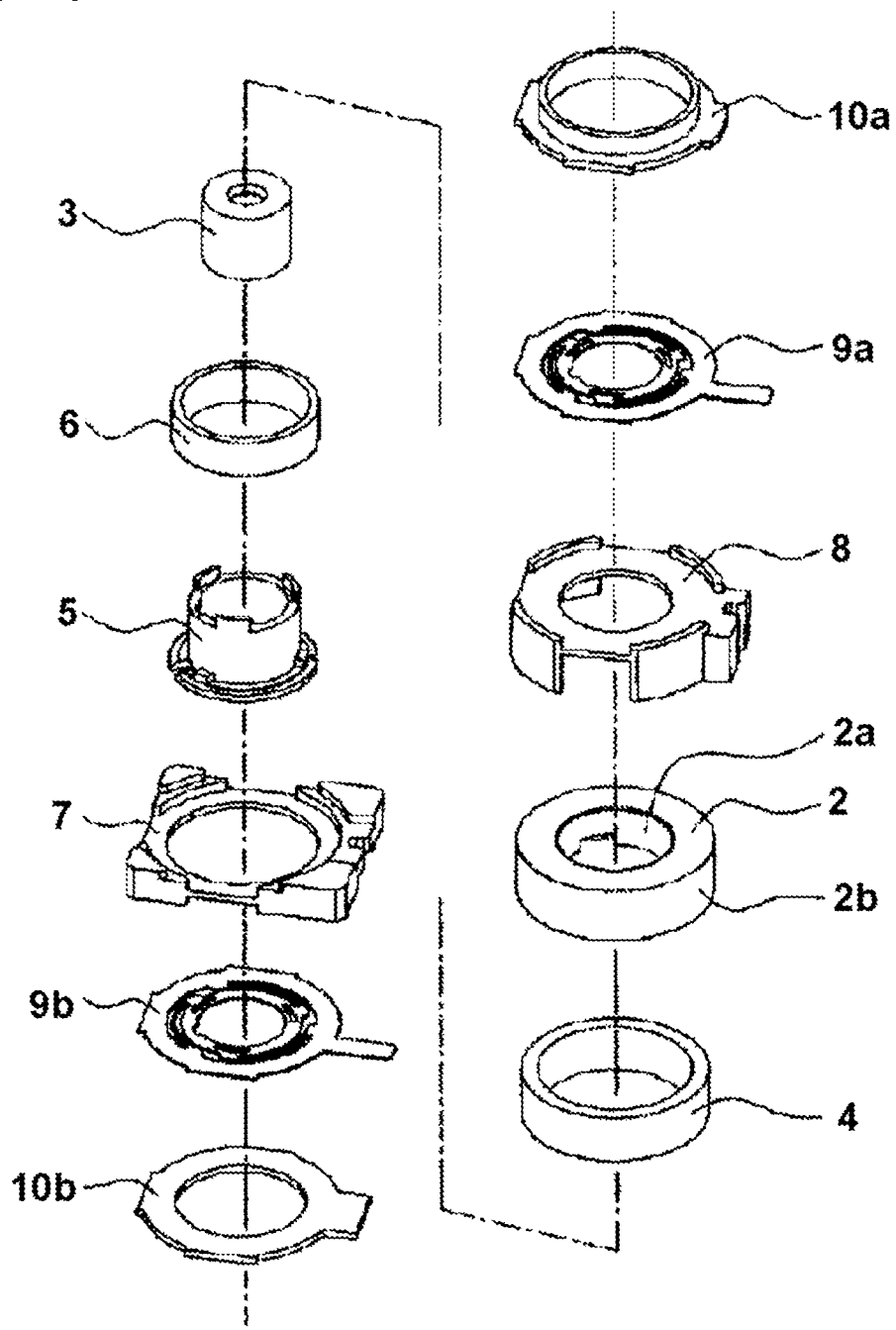

[FIG.3]
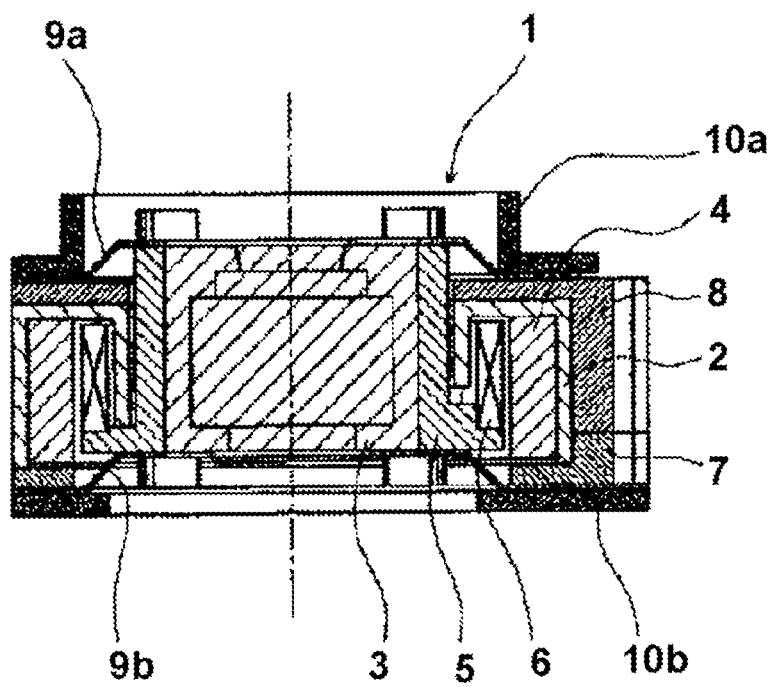
[FIG.4]
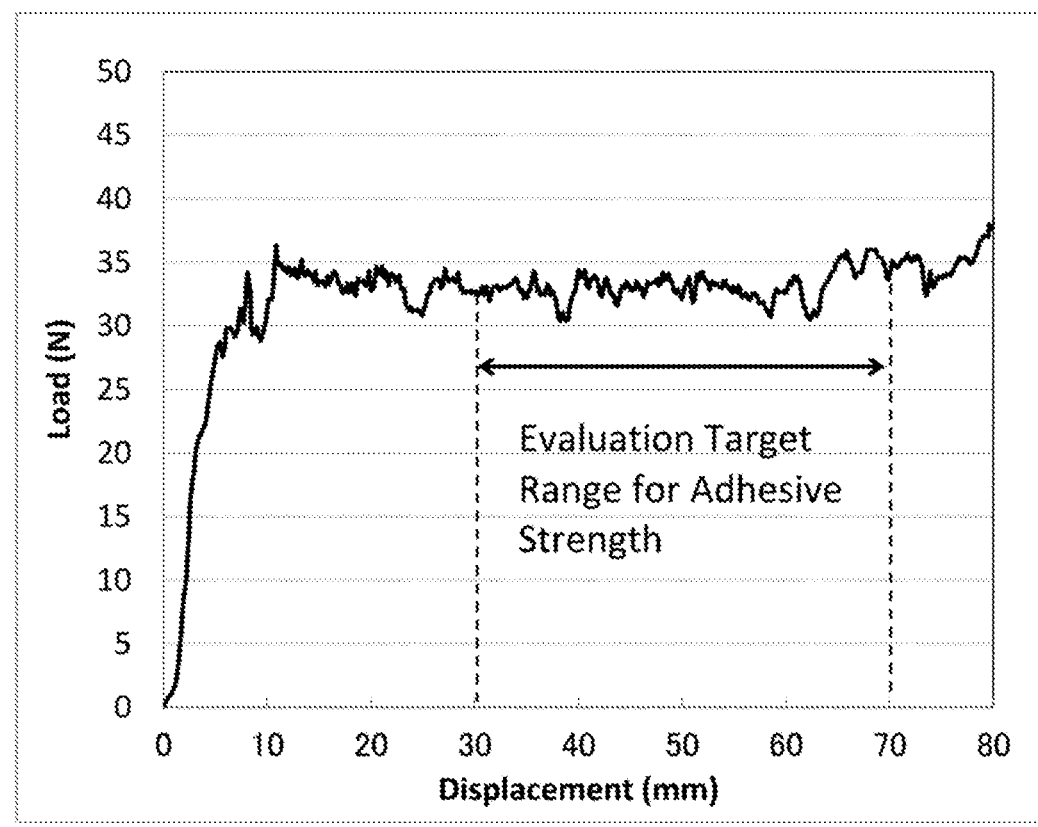

TITANIUM COPPER FOIL HAVING PLATED LAYER

TECHNICAL FIELD

The present invention relates to a titanium copper foil having a plated layer. More particularly, the present invention relates to a titanium copper foil that is suitable as a conductive spring material for autofocus camera modules (AFMs).

BACKGROUND ART

An electronic part called an autofocus camera module (AFM) is used in camera lens sections for mobile phones. The autofocus function of the camera for the mobile phone moves the lens in a fixed direction by spring force of the material used for the AFM, while moving the lens in a direction opposite to the spring force-acting direction by means of electromagnetic force generated by passing an electric current through a coil wound around the periphery. By such a mechanism, the camera lens is driven to exert the autofocus function (for example, Patent Documents 1 and 2).

Therefore, a copper alloy foil for use in the AFMs requires strength sufficient to withstand deformation of the material due to the electromagnetic force. If the strength is low, the material cannot withstand displacement due to the electromagnetic force, and permanent deformation (settling) will occur. If the settling occurs, the lens cannot move to a desired position and the autofocus function cannot be produced, when a constant current is passed.

For spring materials for AFMs, Cu—Ni—Sn based copper alloy foils having a foil thickness of 0.1 mm or less and tensile strength of 1100 MPa or more have been conventionally used. However, a recent demand for cost reduction has led to the use of titanium copper foils which have relatively lower raw material costs than the Cu—Ni—Sn based copper alloys, and the demand for the titanium copper foil is thus increasing.

Under such circumstances, various titanium coppers suitable as spring materials for the AFMs have been proposed. For example, Patent Document 3 has proposed a titanium copper foil wherein it comprises Ti of 1.5 to 5.0% by mass, the balance being copper and inevitable impurities, and 0.2% yield strength in a direction parallel to a rolling direction is at least 1100 MPa, and it satisfies a relationship: $I_{(220)}/I_{(311)} \geq 15$ where $I_{(220)}$ and $I_{(331)}$ represent integrated intensities for a plane (220) and a plane (331), respectively, as measured using an X-ray diffraction analysis in the rolling plane, in order to improve the 0.2% yield strength and settling resistance for the titanium copper foil. Further, Patent Document 4 has proposed a titanium copper foil wherein it comprises Ti of 1.5 to 5.0% by mass, the balance being copper and inevitable impurities, wherein 0.2% yield strength in a direction parallel to a rolling direction is 1100 MPa or more, and wherein arithmetic average roughness (Ra) in a direction perpendicular to the rolling direction is 0.1 μm or less, for the purpose of improving settling resistance.

PRIOR ART DOCUMENT

[Patent Document 1] Japanese Patent Application Public Disclosure (KOKAI) No. 2004-280031 A1
[Patent Document 2] Japanese Patent Application Public Disclosure (KOKAI) No. 2009-115895 A1
[Patent Document 3] Japanese Patent Application Public Disclosure (KOKAI) No. 2014-80670 A1
[Patent Document 4] Japanese Patent Application Public Disclosure (KOKAI) No. 2014-37613 A1

SUMMARY OF INVENTION

Problem to be Solved by the Invention

On the other hand, for manufacturing the spring materials for the AFMs from the titanium copper foils, a method of shape processing the titanium copper foil by etching has been utilized. Furthermore, depending on the application of the spring materials made of the titanium copper foils, soldering, laminating with a resin and sealing with a resin may be performed, in addition to plating for the purpose of preventing discoloration, etc. The resulting spring material is joined to the coil via a solder even if the material is for the AFMs. However, conventional development of the titanium copper foil for the AFMs has mainly aimed at improving strength and settling resistance, and has lacked any consideration in carrying out the etching processing, plating processing and joining to the solder.

The etching processing requires, as a basic required performance for the titanium copper foil, improved etching processability for accurately forming the foil to a desired shape.

Furthermore, the etching processing or the plating processing includes a step of treating a material to be treated with an acid solution or an alkaline solution. The plating processing further includes a step of treating the material with a plating solution. In the step using such various treating solutions, the washing with water and drying are carried out in order to remove the treating solutions. For thicker copper elongation products in the form of plate or strip, the washing with water and drying of the treating solutions can be easily carried out, and the solutions are removed by a method such as roll type or blower type methods. On the other hand, when the product has a fine shape and decreased thickness, it will be difficult to sufficiently remove the moisture contained in the treating solutions and the washing water. When the moisture remains, any component of the treating solution inevitably remaining in the moisture will react with the treated material to form compounds, which will adhere to the surface as residues after evaporation of water. The titanium copper particularly contains Ti which is an active element, so that it will tend to react with the component of the treating solution to form complex compounds and produce residues. The presence of residues will tend to generate discoloration after etching processing into the shape of the product and the like (if discoloration is present, the product is determined as a defect by appearance inspection so that the yield decreases), and will tend to cause a problem of reducing the adhesive strength for the bonding with a member such as a solder, a resin and the like.

For the etching processing using photolithography, a resist film having a shape corresponding to that of the product is formed on the surface of the material to be etched. This resist film needs to adhere to the material to be etched with predetermined strength, and peels off during etching when the strength is insufficient. In addition, when the resist is peeled off during etching, uniform etching will not be possible and it will be difficult to obtain any targeted size and shape. Therefore, a surface conditioning treatment may be performed before etching in order to increase the bonding strength. The surface conditioning treatment is performed for corroding a surface layer with an acid to roughen the surface, and has an effect of improving the bonding strength to the resist film. In the plating processing, the surface layer may be also corroded by an acid in a pre-plating treatment in order to remove contaminants and an oxide film on the surface to expose a newly formed surface. However, if such a surface conditioning treatment or pre-plating treatment is directly performed on the surface of titanium copper, surface residues may be generated after the etching processing, conversely reducing the bonding strength to the member. Further, in bonding to another member using soldering, laminating with a resin, sealing with a resin, and the like, satisfactory adhesive strength is required.

In view of the above circumstances, an object of the present invention is to provide a titanium copper foil having improved adhesiveness to a solder and higher resistance to discoloration due to an high temperature and high humidity environment, and against an acid solution or an alkaline solution, and as well as also having improved etching processability.

Means for Solving the Problem

The present inventors initially tried to plate the surface of the titanium copper with Ni, which is a hardly oxidized element, in order to protect the surface of the titanium copper. The inventors have verified that this will allow suppression of the oxidation of the surface and improvement of the resistance to the acid solution or alkaline solution, but on the contrary, the inventors have found that the etching processability will be deteriorated, so that the plated titanium copper will not be able to be suitably used as a spring material for the AFMs. The inventors have further performed extensive studies based on the findings and found that, by forming an underlying Cu plated layer and a Sn plated layer in this order on the surface of the titanium copper foil while controlling the glossiness of the surface of the base metal, the resistance to the acid solution or the alkaline solution will be improved, as well as etching processability will be able to be ensured.

The present invention has been accomplished based on the above findings. In one aspect, the present invention provides a titanium copper foil comprising a base metal, the base metal having a composition containing Ti of from 1.5 to 5.0% by mass, the balance being copper and inevitable impurities, and the base metal having a thickness of from 0.018 to 0.1 mm, wherein the titanium copper foil has a plated layer in which an underlying Cu plated layer and a Sn plated layer have been laminated in this order on a surface of the base metal, and has an adhesive strength of 1 N or more as measured by a solder adhesive strength test according to a definition in the specification.

In one embodiment of the titanium copper foil according to the present invention, the underlying Cu plated layer has a thickness of from 0.01 to 2.0 μm.

In another embodiment of the titanium copper foil according to the present invention, the Sn plated layer has a thickness of from 0.01 to 2.0 μm.

In yet another embodiment of the titanium copper foil according to the present invention, the base metal further contains one or more elements selected from Ag, B, Co, Fe, Mg, Mn, Mo, Ni, P, Si, Cr and Zr in a total amount of from 0 to 1.0% by mass.

In yet another embodiment of the titanium copper foil according to the present invention, the titanium copper foil has a tensile strength in a direction parallel to a rolling direction of 1100 MPa or more.

In yet another embodiment of the titanium copper foil according to the present invention, the adhesive strength is 20 N or more.

In yet another embodiment of the titanium copper foil according to the present invention, a decreasing rate of the adhesive strength after heating at a temperature of 85° C. for 100 hours relative to the adhesive strength before the heating is less than 5%.

In yet another embodiment of the titanium copper foil according to the present invention, the titanium copper foil is used for etching processing.

In another aspect, the present invention provides an electronic component comprising the titanium copper foil according to the present invention.

In yet another aspect, the present invention provides a joined body of the titanium copper foil according to the present invention and a solder, wherein the joined body has a joined site to the solder on a surface of the plated layer on the titanium copper foil.

In still another aspect, the present invention provides a method for joining the titanium copper foil according to the present invention to a conductive member, comprising shape processing the titanium copper foil by etching; and joining the resulting profiled product of the titanium copper foil to the conductive member at a location having the plated layer by soldering.

In yet another aspect, the present invention provides an autofocus module comprising the titanium copper foil according to the present invention as a spring material.

In another aspect, the present invention provides an autofocusing camera module comprising a lens; a spring member made of the titanium copper foil according to the present invention for elastically biasing the lens to an initial position in an optical axis direction; and an electromagnetic driving means configured to generate electromagnetic force for withstanding the biasing force of the spring member so that the lens can be driven in the optical axis direction, wherein the electromagnetic driving means comprises a coil, and wherein the spring member is joined to the coil at a location having the plated layer by soldering.

In yet another aspect, the present invention provides a method for producing a titanium copper foil, comprising:

preparing a base metal having a composition containing Ti of from 1.5 to 5.0% by mass, the balance being copper and inevitable impurities, wherein the base metal has a thickness of from 0.018 to 0.1 mm, and has a surface glossiness of from 100 to 200; and laminating an underlying Cu plated layer and a Sn plated layer in this order on a surface of the base metal.

In one embodiment of the method for producing the titanium copper foil according to the present invention, the underlying Cu plated layer has a thickness of from 0.01 to 2.0 μm.

In another embodiment of the method for producing the titanium copper foil according to the present invention, the Sn plated layer has a thickness of from 0.01 to 2.0 μm.

In yet another embodiment of the method for producing the titanium copper foil according to the present invention, the base metal further contains one or more elements selected from Ag, B, Co, Fe, Mg, Mn, Mo, Ni, P, Si, Cr and Zr in a total amount of 0 to 1.0% by mass.

In yet another embodiment of the method for producing the titanium copper foil according to the present invention, the surface of the base metal having the surface glossiness of from 100 to 200 has arithmetic average roughness (Ra) of from 0.5 μm or less.

Effects of the Invention

The titanium copper foil having the plated layer according to the present invention hardly generates any surface residue after etching processing or plating processing. This will allow prevention of discoloration of the titanium copper foil and also inhibition of decreased adhesive strength to the member. Further, the titanium copper foil having the plated layer according to the present invention has the characteristic of suppressing any surface residue after etching processing and plating processing, while having the characteristic of improved etching processability. Therefore, the titanium copper foil having the plated layer according to the present invention can be also suitably used as a spring material for AFMs, which is required to have strength, discoloration resistance, etching and soldering properties at the same time.

BRIEF DESCRIPTION OF DRAWINGS

FIG. 1 is a cross-sectional view showing an autofocus camera module according to the present invention.

FIG. 2 is an exploded perspective view of the autofocus camera module of FIG. 1.

FIG. 3 is a cross-sectional view showing the operation of the autofocus camera module of FIG. 1.

FIG. 4 shows an example of measurement results of a solder adhesive strength test.

MODES FOR CARRYING OUT THE INVENTION (1) Concentration of Ti

The titanium copper foil having the plated layer according to the present invention may comprise the titanium copper having the composition containing Ti of from 1.5 to 5.0% by mass, the balance being copper and inevitable impurities, as the base metal. The inevitable impurities, which are inherently unnecessary substances in metal products, may be present in raw materials or inevitably mixed in producing steps. The inevitable impurities are acceptable since they are present in a miner amount and have no effect on the metal products. In addition, the total amount of inevitable impurities may be generally 50 ppm by mass or less, and typically 30 ppm by mass or less, and more typically 10 ppm by weight or less. For the titanium copper, the strength and conductivity can be increased by allowing solid solution of Ti into the Cu matrix with a solutionizing treatment and then dispersing fine precipitates in the alloy with an aging treatment. If the Ti concentration is less than 1.5% by mass, the precipitation of precipitates will become insufficient and the desired strength cannot be obtained. If the Ti concentration exceeds 5.0% by mass, the workability will deteriorate and the material will be easily cracked during rolling. In view of the balance between the strength and the workability, the Ti concentration may be preferably from 2.9 to 3.5% by mass.

(2) Other Additive Elements

The strength can be further improved by adding one or more of Ag, B, Co, Fe, Mg, Mn, Mo, Ni, P, Si, Cr and Zr in a total amount of 0 to 1.0% by mass to the base metal. The total content of these elements may be zero, i.e., the base metal may not contain these elements. The reason why the upper limit of the total content of these elements is 1.0% by mass is because the amount of more than 1.0% by mass will lead to degradation of workability and production of a material that is easily cracked during rolling. In view of the balance between the strength and the workability, one or more of the above elements may be preferably contained in a total amount of 0.005 to 0.5% by mass.

The amount of Ag added may be preferably 0.5% by mass or less, and more preferably 0.1% by mass or less. The amount of B added may be preferably 0.5% by mass or less, and more preferably 0.05% by mass or less. The amount of Co added may be preferably 0.5% by mass or less, and more preferably 0.1% by mass or less. The amount of Fe added may be preferably 0.5% by mass or less, and more preferably 0.25% by mass or less. The amount of Mg added may be 0.5% by mass or less, and more preferably 0.1% by mass or less. The amount of Mn added may be 0.1% by mass or less, and more preferably 0.05% by mass or less. The amount of Mo added may be 0.5% by mass or less, and more preferably 0.3% by mass or less. The amount of Ni added may be 0.5% by mass or less, and more preferably 0.1% by mass or less. The amount of P added may be 0.1% by mass or less, and more preferably 0.05% by mass or less. The amount of Si added may be 0.1% by mass or less, and more preferably 0.05% by mass or less. The amount of Cr added may be 0.5% by mass or less, and more preferably 0.4% by mass or less. The amount of Zr added may be 0.5% by mass or less, and more preferably 0.1% by mass or less. However, the addition amount is not limited to those as stated above.

(3) Tensile Strength

The tensile strength required for the titanium copper that may be suitable as the conductive spring material for the autofocus camera module is 1100 MPa or more. The titanium copper according to the present invention can achieve the tensile strength in the direction parallel to the rolling direction of 1100 MPa or more. The tensile strength of the titanium copper according to the present invention may be 1200 MPa or more in a preferred embodiment, and 1300 MPa or more in a further preferred embodiment.

The upper limit of the tensile strength is not particularly limited in terms of the strength intended by the present invention, but the tensile strength of the titanium copper according to the present invention may be generally 2000 MPa or less, and typically 1600 MPa or less, taking labor and costs into account.

In the present invention, the tensile strength in the direction parallel to the rolling direction of the titanium copper is measured in accordance with JIS Z 2241-2011 (Metal Material Tensile Test Method).

(4) Form of Titanium Copper

The base metal of the titanium copper having the plated layer according to the present invention is provided in the form of a foil having a thickness of from 0.018 to 0.1 mm. The thickness of the base metal of 0.018 mm or more can maintain the strength required as a spring material. The thickness of the base metal may be preferably 0.03 mm or more. Further, the thickness of the base metal of 0.1 mm or less can contribute to the miniaturization of electronic components when forming the electronic components such as the spring material and the like using the titanium copper foil. The thickness of the base metal may be preferably 0.08 mm or less, and more preferably 0.06 mm or less.

(5) Plated Layer

One of the features of the titanium copper having the plated layer according to the present invention is that the titanium copper has a plated layer in which an underlying Cu plated layer and a Sn plated layer have been laminated in this order on the surface of the base metal. Although the present invention is not intended to be limited by any theory, the present inventers considers that the laminating of the underlying Cu plated layer and the Sn plated layer in this order improves the resistance to an acid solution or an alkaline solution, thereby hardly producing surface residues after etching processing or plating processing. In this way, discoloration of the titanium copper foil is prevented, and a decrease in the adhesive strength to a member such as a solder and a resin is also suppressed. Further, since the Cu plated layer and the Sn plated layer have also good etching processability, high dimensional accuracy can be ensured even when producing fine electronic components such as the spring materials. The Sn plated layer may be a reflow Sn plated layer.

The plated layer may be formed on a part or the whole of the surface of the foil which is the base metal. Further, the plated layer may be formed on one or both of the main surfaces of the foil which is the base metal. The plated layer can be obtained by, for example, wet plating such as electroplating, electroless plating and immersion plating. The electroplating is preferred in terms of costs.

The plated layer preferably has solder adhesive strength of 1 N or more, and more preferably 2 N or more, as measured by a solder adhesive strength test as described below. The titanium copper foil having the plated layer with the solder adhesive strength of less than 1 N has poor chemical properties and is liable to cause a fault in the etching processing, plating processing, lamination with a resin and sealing with a resin, and like. Thus, discoloration may occur when performing various surface treatments, or defects may be generated when joining other members to the titanium copper foil.

The titanium copper foil having the plated layer according to the present invention can be processed into a desired shape after forming the plated layer in the order of the underlying Cu plated layer and the Sn plated layer. For example, when the titanium copper foil having the plated layer according to the present invention is used as the spring material for the autofocus module, the titanium copper foil may be processed into a desired shape, such as by forming a circuit portion or a spring portion with etching. The shape processing itself with etching may be carried out by known methods, for example, including steps of protecting the surface of the base metal at portions desired to be left after etching by etching resists, then shape processing with dry etching or wet etching, and then removing the resists.

The thickness of the underlying Cu plated layer may be preferably from 0.01 to 2.0 µm in terms of effectively producing the effects intended by the present invention. The thickness of the underlying Cu plated layer may be thicker, and more particularly from 0.1 to 2.0 µm, and more preferably from 1.0 to 2.0 µm, in terms of focusing on the adhesive strength to the solder. However, if the thickness of the underlying Cu plated layer is increased, economic efficiency (cost) will be deteriorated. Further, the use of the plated structure according to the present invention allows the adhesive strength to the solder to be raised to a high practical level even if the thickness of the plated layer is thinner. Therefore, the thickness of the underlying Cu plated layer may be preferably from 0.01 to 1.0 µm, and more preferably from 0.01 to 0.1 µm, in terms of focusing on the costs of plating. Furthermore, the thickness of the underlying Cu plated layer may be preferably from 0.05 to 1.0 µm, and more preferably from 0.1 to 0.5 µm, in terms of balancing the adhesive strength to the solder with the costs of the plating.

The thickness of the Sn plated layer may be preferably from 0.01 to 2.0 µm in terms of effectively producing the effects intended by the present invention. The thickness of the Sn plated layer may be preferably thicker, and more particularly from 0.1 to 2.0 µm, and more preferably from 1.0 to 2.0 µm, in terms of focusing on the adhesive strength to the solder. However, if the thickness of the Sn plated layer is increased, economic efficiency (cost) will be deteriorated. Further, the use of the plated structure according to the present invention allows the adhesive strength to the solder to be raised to a high practical level, even if the thickness of the plated layer is thinner. Therefore, the thickness of the Sn plated layer may be preferably from 0.01 to 1.0 µm, and more preferably from 0.01 to 0.1 µm, in terms of focusing on the costs of plating. Furthermore, the thickness of the Sn plated layer may be preferably from 0.05 to 1.0 µm, and more preferably from 0.1 to 0.5 µm, in terms of balancing the adhesive strength to the solder with the costs of the plating. The operator can select any thickness of the plated layer in terms of the costs, yield and the like.

In the present invention, the thickness of the plated layer is measured according to the fluorescent X-ray type test method of JIS H 8501-1999. In Examples, the measurement was carried out using a fluorescent X-ray coating thickness gauge (SFT 9250) from Hitachi High-Tech Science Corporation.

(6) Solder Adhesiveness

The titanium copper foil having the plated layer according to the present invention can have improved solder adhesiveness. In a preferred embodiment, the titanium copper foil having the plated layer according to the present invention can have average adhesive strength of 1 N or more, and preferably 2 N or more, and more preferably 5 N or more, and still more preferably 10 N or more, and even still more preferably 15 N or more, and still more preferably 20 N or more, and even still more preferably 25 N or more, and still more preferably 30 N or more, and for example from 1 to 40 N, as measured by the solder adhesive strength test as described below.

Furthermore, the titanium copper foil having the plated layer according to the present invention has improved heat resistance, and in one embodiment, it is possible to suppress a decrease in the solder adhesive strength after heating at 85° C. for 100 hours to less than 5%.

The procedure of the solder adhesive strength test will be described. The titanium copper foil having the plated layer and a pure copper foil (alloy number C1100 as defined in JIS H3100-2012; foil thickness of 0.02 mm to 0.05 mm) are joined together via a lead-free solder (Sn-3.0% by mass Ag-0.5% by mass Cu). The titanium copper foil is in the form of a rectangle having a width of 15 mm and a length of 200 mm, and the pure copper foil is in the form of a rectangle having a width of 20 mm and a length of 200 mm. The lead-free solder (diameter: 0.4±0.02 mm, length 120±1 mm) is arranged in an area of 30 mm×15 mm at a central portion in the lengthwise direction so as to fall within the above-mentioned area, and joined at a joining temperature of 245° C.±5° C. After joining, the adhesive strength is measured by performing a 180° peeling test at a speed of 100 mm/min. The average value of the load (N) in the section of 40 mm from 30 mm to 70 mm of peeling displacement is defined as the adhesive strength. An example of measurement results of the solder adhesive strength test is shown in FIG. 4.

(7) Application

The titanium copper foil having the plated layer according to the present invention can be suitably used as a material for electronic parts, including, but not limited to, switches, connectors (particularly fork type FPC connectors which do not require severe bending workability), autofocus camera modules, jacks and relays. A printed circuit board can be also manufactured by laminating the titanium copper foil having the plated layer according to the present invention and an insulating substrate so as to expose the plated layer to form a copper clad laminating plate, and forming a wiring via an etching process to provide a printed wiring board, and mounting various electronic components on the metal wiring of the printed wiring board by soldering.

In particular, the titanium copper having the plated layer according to the present invention can be suitably used as a spring material for autofocus modules. Therefore, in one aspect, the present invention is an autofocus module comprising the titanium copper according to the present invention as a spring material. The typical autofocus module comprises a lens; a spring member for elastically biasing the lens to an initial position in the optical axis direction, the spring member being made of the titanium copper having the plated layer according to the present invention; and an electromagnetic drive means configured to generate electromagnetic force for withstanding the biasing force of the spring member so that the lens can be driven in the optical axis direction. By way of example, the electromagnetic driving means comprises a U-shaped cylindrical yoke, a coil housed inside the inner peripheral wall of the yoke, and a magnet enclosing the coil and housed inside the outer peripheral wall of the yoke. The spring member can be joined to the coil (typically the lead wire of the coil) at the position having the plated layer by soldering.

FIG. 1 is a sectional view showing an example of the autofocus camera module according to the present invention, FIG. 2 is an exploded perspective view of the autofocus camera module of FIG. 1, and FIG. 3 is a cross-sectional view showing the operation of the autofocus camera module of FIG. 1.

The autofocus camera module 1 comprises a U-shaped cylindrical yoke 2, a magnet 4 attached to the outer wall of the yoke 2, a carrier 5 comprising a lens 3 in a central position, a coil 6 attached to the carrier 5, a base 7 to which the yoke 2 is attached, a frame 8 supporting the base 7, two spring members 9a, 9b for supporting the carrier 5 at the upper and lower positions, and two caps 10a, 10b covering these upper and lower positions. These two spring member 9a, 9b are the same articles, and support the carrier 5 by holding it from the upper and lower positions in the same positional relationship, while functioning as a power supply route to the coil 6. The carrier 5 moves upward by applying an electric current to the coil 6. It is noted that the wordings "upper" and "lower" are used herein as needed, and they refer to upper and lower in FIG. 1 and the upper represents a positional relationship that is directed from the camera to a subject.

The yoke 2 is a magnetic material such as soft iron, and assumes a U-shaped cylindrical shape whose upper surface portion is closed, and has cylindrical inner wall 2a and outer wall 2b. A ring-shaped magnet 4 is attached (adhered) to the inner surface of the U-shaped outer wall 2b.

The carrier 5 is a molded product made of a synthetic resin or the like, which has a cylindrical structure with a bottom portion, and the carrier 5 supports the lens in the central position, and binds the pre-formed coil 6 onto the bottom surface outwardly so that the coil 6 is mounted thereon. The yoke 2 is integrated by fitting it to the inner periphery of the base 7 which is a rectangular resin molded article, and the whole yoke 2 is further secured by the frame 8 which is a resin molded article.

The spring members 9a, 9b are fixed by holding their outermost peripheral portions by the frame 8 and the base 7, respectively, and the cutout grooves arranged per 120° on the inner peripheral portion are fitted to the carrier 5 and fixed by thermal caulking or the like.

The spring member 9b and the base 7 as well as the spring member 9a and the frame 8 are fixed by adhesive and thermal caulking, respectively, and further the cap 10b is attached to the bottom surface of the base 7, and the cap 10a is attached to the upper portion of the frame 8, and the spring member 9b is sandwiched between the base 7 and the cap 10b and the spring member 9a is sandwiched between the frame 8 and the cap 10a, so that they are adhered.

The lead wire of one of the coils 6 is extended upward passing through the groove provided on the inner peripheral surface of the carrier 5, and soldered to the spring member 9a. The other lead wire is extended downward passing through the groove provided on the bottom surface of the carrier 5, and soldered to the spring member 9b.

The spring members 9a, 9b are plate springs made of the titanium copper foil according to the present invention. They have spring properties and elastically energize the lens 3 to the initial position in the optical axis direction. At the same time, they also act as power supply paths to the coil 6. One position on the outer peripheral portion of each of the spring members 9a, 9b projects outward, thereby acting as a power supply terminal.

The cylindrical magnet 4 is magnetized in the radial (diameter) direction and forms a magnetic path passing through an inner wall 2a, an upper surface portion and an outer wall 2b of the U-shaped yoke 2, and the coil 6 is disposed in the gap between the magnet 4 and the inner wall 2a.

The spring members 9a, 9b have the same shape, and are attached in the same positional relationship as shown in FIGS. 1 and 2, so that any axial deviation can be suppressed when the carrier 5 is moved upward. Since the coil 6 is manufactured by pressure molding after winding, the accuracy of the finished outer diameter of the coil can be improved, thereby allowing the coil to be easily arranged in a predetermined narrow gap. The carrier 5 is butted to the base 7 at the lowest position and butted to the yoke 2 at the uppermost position, and it will be thus equipped with the butting mechanisms in the upper and bottom vertical direction, thereby preventing any detachment.

FIG. 3 shows a sectional view when upwardly moving the carrier 5 having the lens 3 for the autofocus by applying an electric current to the coil 6. When an electric power is applied to the power supply terminals of the spring members 9a, 9b, the electric current flows through the coil 6, and the upward electromagnetic force acts on the carrier 5. On the other hand, restoring force of two linked spring members 9a, 9b downwardly acts on the carrier 5. Therefore, the distance of upward movement of the carrier 5 will be a position where the electromagnetic force and the restoring force are balanced. This will allow determination of the moving amount of the carrier 5 according to the amount of the electric current applied to the coil 6.

Since the upper spring member 9a supports the upper surface of the carrier 5 and the lower spring member 9b support the lower surface of the carrier 5, the restoring force will equally work downward on the upper and lower surfaces of the carrier 5, so that any axial displacement of the lens 3 can be suppressed.

Therefore, for the upward movement of the carrier 5, no guide by ribs and the like is needed and used. Since there is no sliding friction by the guide, the amount of movement of the carrier 5 will be purely controlled by the balance between the electromagnetic force and the restoring force, thereby achieving the smooth and accurate movement of the lens 3. This will achieve autofocusing with reduced blurring of the lens.

Incidentally, although the magnet 4 has been described as one having the cylindrical shape, the magnet is not limited to this shape, and may be divided 3 to 4 parts and magnetized in the radial direction, which may be fixed by adhering to the inner surface of the outer wall 2b of the yoke 2.

(8) Production Method

An example of the method for producing the base material of the titanium copper according to the present invention will be described. First, an ingot is produced by melting and casting. The melting and casting is preferably carried out in essentially a vacuum or in an inert gas atmosphere to prevent oxidative wear of titanium. The presence of any unmelted additive element in the melting will prevent any effective action on improvement of the strength. Therefore, the third element with a high melting point, such as Fe and Cr, must be maintained for a certain period of time after adding the element and then sufficiently stirring it, in order to eliminate the unmelted additive element. On the other hand, Ti may be added after melting the third element because Ti is relatively easily melted in Cu. Therefore, preferably, one or more selected from Ag, B, Co, Fe, Mg, Mn, Mo, Ni, P, Si, Cr and Zr are added to Cu, and Ti is then added in a predetermined amount to produce the ingot.

Hot rolling, cold rolling 1, solution treatment, cold rolling 2 and aging treatment can be then carried out in this order to provide the finished copper alloy having the desired thickness and properties. Cold rolling 3 may be carried out after the aging treatment in order to obtain the higher strength. The hot rolling and subsequent cold rolling 1 may be merely carried out under conventional conditions as used in the production of titanium copper, and there is no specific required condition. Further, although the solution condition may be also carried out under the conventional conditions, such as at 700 to 1000° C. for 5 seconds to 30 minutes.

To obtain the higher strength, the rolling reduction ratio of cold rolling 2 may be preferably set to 55% or more, and more preferably 60% or more, and even more preferably 65% or more. The upper limit of the rolling reduction rate is not particularly limited in terms of the strength targeted by the present invention, but the upper limit will not be more than 99.8% from the industrial viewpoint.

The heating temperature of the aging treatment may be preferably from 200 to 450° C., and the heating time may be preferably 2 to 20 hours. If the heating temperature is less than 200° C. or more than 450° C., it will be difficult to obtain the higher strength. If the heating time is less than 2 hours or more than 20 hours, it will be also difficult to obtain the higher strength.

The rolling reduction rate when carrying out the cold rolling 3 may be preferably set to 35% or more, and more preferably 40% or more, and even more preferably 45% or more. If the rolling reduction rate is less than 35%, it will be difficult to obtain the higher strength. The upper limit of the rolling reduction rate is not particularly defined in terms of the strength, but the upper limit will not be more than 99.8% from the industrial viewpoint.

Incidentally, one of ordinary skill in the art will understand that polishing, grinding, shot-blasting and pickling steps and the like, for removing oxidized scales on the surface, can be performed in the intervals of the above respective steps, as needed.

In the cold rolling step for finishing the material to the thickness of the product (the cold rolling 2 corresponds to this step, and when carrying out the cold rolling 3, the cold rolled 3 corresponds to this step), fine irregularities on the surface is adjusted such that the adhesive strength of the plated layer will be 1 N or more in the subsequent plating step. If the fine irregularities on the surface are larger, the adhesive strength of the plated layer will be increased due to development of the anchor effect or an increase in the adhering area. Thus, the fine irregularities are imparted to the surface by properly producing oil pits during the cold rolling to obtain higher adhesive strength of the plated layer. The fine irregularities on the surface are fine to such an extent that they cannot be expressed by the surface roughness Ra and the like, which otherwise can be expressed by glossiness. The glossiness according to the present invention is defined as specular glossiness as measured at an incident angle of 60° in the rolling direction according to JIS Z8741-1997.

The material with lower glossiness has larger fine irregularities, and the material with higher glossiness has smaller fine irregularities. In order to achieve the adhesive strength to solder of 1 N or more when performing the soldering test as described below in Examples, the glossiness of the titanium copper may be preferably from 100 to 200 for example, and desirably from 100 to 170 in terms of the adhesive strength to the solder, and more preferably from 100 to 130. In the cold rolling step for finishing the material to the thickness of the product, a pass schedule is designed such that the glossiness is from 100 to 200. The pass schedule refers to matters such as a working ratio per one rolling pass, viscosity or temperature of the rolling oil, a rolling speed, rolling tension, materials of rolling rolls, or diameter of rolling rolls. In order to have glossiness of from 100 to 200, for example, the rolling speed during the final pass of the cold rolling for finishing the material to the thickness of the product is set to be 50 m/min or more in the case of the titanium copper foil having the tensile strength of 1200 MPa or more. The higher rolling speed will facilitate inflow of the rolling oil between the rolling roll and the titanium copper foil, thereby resulting in easy generation of the oil pits. If the rolling speed is less than 50 m/min, the inflow of the rolling oil is not sufficient so that beneficial oil pits will not be generated. As a result, the glossiness is more than 200, and the adhesive strength of the plated layer is less than 2N due to smaller fine irregularities on the surface. It is note that even if the glossiness is less than 100, there is no adverse effect on the adhesive strength, but it is necessary to further increase the rolling speed in order to obtain the glossiness of less than 100. The higher rolling speed may make it difficult to obtain uniform shape due to thermal expansion of the rolls, thereby resulting in deteriorated manufacturability. Therefore, the glossiness should be preferably set to 100 or more.

It should be understood that after carrying out the cold rolling step for finishing the material to the thickness of the product, the arithmetic average roughness Ra in the direction parallel to the rolling direction of the titanium copper foil surface before the plating step is measured in accordance with JIS B0601-2001. For a thinner material such as the titanium copper foil, increased surface roughness will locally produce a thicker portion or a thinner portion of the plate thickness, so that it may be difficult to obtain any performance for a spring. Thus, the Ra for the titanium foil surface may be preferably adjusted to 0.5 μm or less, and more preferably 0.1 μm or less, and for example from 0.01 to 0.5 μm, and typically from 0.02 to 0.2 μm, in terms of achieving uniform spring properties.

EXAMPLES

Hereinafter, Examples of the present invention will be illustrated, but these Examples are presented in order to provide better understanding of the present invention and its advantages, and in no way intended to limit the present invention.

A base metal of each sample had a composition comprising predetermined alloy components set forth in Table 1, the balance being copper and inevitable impurities. 2.5 kg of an electrolytic copper was melted in a vacuum melting furnace, and the alloy elements were added such that the alloy composition as shown in Table 1 was obtained. The molten metal was casted into a mold made of cast iron to produce an ingot having a thickness of 30 mm, a width of 60 mm and a length of 120 mm. The ingot was then subjected to the hot rolling, and processed sequentially in the following steps to produce a titanium foil having a foil thickness of 0.03 mm.

(1) Hot rolling: the ingot was heated at 950° C. for 3 hours and rolled to a thickness of 10 mm.

(2) Grinding: the oxide scale formed in hot rolling was removed by a grinder. The thickness after grinding was 9 mm.

(3) Cold rolling 1: the rolling reduction ratio was adjusted such that the final foil thickness was obtained, in view of the rolling reduction ratio of the cold rolling 2.

(4) Solution Treatment: the material was charged in an electric furnace heated to 800° C. and maintained for 5 minutes, and the sample was quenched by placing it in a water bath.

(5) Cold Rolling 2: the rolling was performed at a rolling reduction rate of 98%. In this case, the glossiness was changed by adjusting the rolling speed during the final pass of the cold rolling to the speed set forth in Table 1.

(6) Aging Treatment: the material was heated in an Ar atmosphere at 300° C. for two hours.

The surface of each titanium foil obtained was cleaned by degreasing and pickling, and then subjected to a plating treatment on the surface with the type of plating and thickness described in Table 1.

The Cu plated layer was formed under the following electroplating conditions:
Cu ion: 62 g/L;
bath temperature: 60° C.;
current density: 4.0 A/dm$^2$;
duration of time: adjusted depending on the plating thickness.

The Sn plated layer was formed under the following electroplating conditions:
Sn ion: 29 g/L;
bath temperature: 40° C.;
current density: 1.7 A/dm$^2$;
duration of time: adjusted depending on the plating thickness.

Further, reflow was also carried out depending on the test numbers, after the Sn plating. Reflow conditions may be in commonly used methods, and in the present case, under conditions of 400° C. for 100 sec.

The Ni plated layer was formed under the following electroplating conditions:
Ni ion: 20 g/L;
pH: 3.0;
bath temperature: 50° C.;
current density: 5 A/dm$^2$;
duration of time: adjusted depending on the plating thickness.

It should be noted that inevitable impurities are present in the actual plated layer. The thickness of the plated layer was measured by the fluorescent X-ray thickness meter as described above.

<1. Surface Roughness>

The surface of each titanium foil obtained by the rolling processing was cleaned by degreasing and pickling, and measured for the arithmetic average roughness Ra in the direction parallel to the rolling direction of the surface according to a standard JIS B0601-2001 using a contact-type roughness meter (SE-3400) available from Kosaka Laboratory Ltd.

<2. Measurement of Glossiness>

Particularly in the case of a copper foil produced by the rolling, the state of the surface can be represented by glossiness as well as roughness (Ra and the like). As stated above, since the glossiness is a numerical value that varies depending on the amounts of the oil pits and the glossiness of materials may vary even if the materials have the same surface roughness, it is necessary to consider the impact on the anchor effect produced by the oil pits. Thus, the surface of each titanium foil obtained by the rolling was cleaned by degreasing and pickling, and the glossiness of the copper foil before the surface treatment was then determined at an incident angle of 60° in the rolling direction using a gloss meter sold by NIPPON DENSHOKU INDUSTRIES Co. Ltd. under the product name of Handy Gloss Meter PG-1, in accordance with JIS Z8741-1997.

<3. Solder Adhesive Strength Test>

In accordance with the procedure of the solder adhesives strength test as stated above, the adhesive strength to the solder was measured. Each sample foil after plating (Comparative Example 1 has no plating) and a pure copper foil (C1100, a foil thickness of 0.035 mm) were joined via a Pb-free solder (ESC M705; composition: Sn-3.0 mass % Ag-0.5 mass % Cu) available from Senju Metal Industry Co., Ltd., and the average adhesive strength was measured by carrying out the 180° peeling test at a speed of 100 mm/min using a precise load measurement device (MODEL-1605NL) available from AIKOH ENGINEERING CO., LTD. After solder joining, the measurement of the adhesive strength was performed on both before heating and after heating, the heating conditions being a temperature of 85° C. for 100 hours. The adhesive strength after heating was evaluated as ○ (single circle) when a decrease in the adhesive strength after heating was less than 5% and as x when the decrease was 5% or more.

<4. Multiple Environment Test>

Each sample foil was investigated for the degree of discoloration when the foil was held at a temperature 85° C. and a relative humidity of 85% for 100 hours in a thermostatic chamber. The sample foil was evaluated as ◉ (double circle) when the sample was equivalent to a Ni plating material of 0.1 μm (Comparative Example 2); as ○ (single circle) when discoloration is smaller as compared with an unprocessed material (Comparative Example 1); and as x when discoloration was equivalent to or larger than that of the unprocessed material (including Comparative Example 1). When results of increased discoloration resistance were obtained according to this test, they would indirectly indicate a decreased amount of the residue generated on the sample foil surface (an amount of generation of intermetallic compounds).

<5. Gas Corrosion Test>

Each sample foil was studied for the degree of discoloration when a hydrogen sulfide gas of 3±1 ppm was sprayed for 20 minutes in a gas corrosion test equipment (GH-180) which was maintained at a temperature 40° C. and a relative humidity of 50% and which was available from Yamazaki Seiki Laboratory Co., Ltd. The sample foil was evaluated as x when discoloration occurred and as ○ (single circle) when discoloration did not occur. When results of increased resistance to discoloration were obtained according to this test, they would indirectly indicate a decreased amount of the residue generated on the sample foil surface (an amount of generation of intermetallic compounds).

<6. Etching Linearity>

Each sample foil was etched by using an aqueous solution having 37% by mass of ferric chloride and a Baume degree of 40° to form a straight circuit having a line width of 100 μm and a length of 150 mm. The circuit was observed (observation length of 200 μm) by using a scanning electron microscope (S-4700 available from Hitachi, Ltd.) and the circuit having a difference between a maximum circuit width and a minimum circuit width of less than 4 μm was evaluated as ⊚ (double circle); 4 to 10 μm as ○ (single circle); and more than 10 μm as x.

<7. Strength Test (Tensile Strength)>

For the sample foil after plating of Example 1, the tensile strength in the direction parallel to the rolling direction was measured using the tensile tester according to the measurement method as described above, and was 1415 MPa.

The results are shown in Table 1. Table 1 demonstrates that by performing the Sn plating on the underlying Cu plating, the adhesive strength to the solder and the resistance to discoloration can be ensured while improving the etching linearity.

Comparative Example 1 shows poor adhesive to the solder and discoloration after the multiple environment test and after the gas corrosion test, because in Comparative Example 1, no plating was performed.

Comparative Example 2 that carried out the Ni plating on the titanium copper foil shows that the adhesive strength to the solder was improved as compared with the unprocessed material of the titanium copper and discoloration after the multiple environment test and gas corrosion test slightly occurred, but etching properties were deteriorated.

Comparative Example 3 that subjected the titanium copper foil to the Cu plating shows that the adhesive strength to the solder was equivalent to that of the unprocessed material and the etching properties were good, but discoloration occurred by the gas corrosion test because residues remained on the plated surface.

Comparative Examples 4 and 5 show that the adhesive strength to the solder before and after heating was decreased because the glossiness of the base metals was too high.

TABLE 1

| | | Base Metal | | | | |
|---|---|---|---|---|---|---|
| No. | Rolling Speed (m/min) | Components (wt %) | Secondary Components (wt %) | Plate Thickness (mm) | Ra. um | Glossiness |
| Example 1 | 100 | Cu—3.2% Ti | — | 0.03 | 0.07 | 200 |
| Example 2 | 100 | Cu—3.2% Ti | — | 0.03 | 0.07 | 200 |
| Example 3 | 100 | Cu—3.2% Ti | — | 0.03 | 0.07 | 200 |
| Example 4 | 100 | Cu—3.2% Ti | — | 0.03 | 0.07 | 200 |
| Example 5 | 100 | Cu—3.2% Ti | — | 0.03 | 0.07 | 200 |
| Example 6 | 100 | Cu—3.2% Ti | — | 0.03 | 0.07 | 200 |
| Example 7 | 100 | Cu—3.2% Ti | — | 0.03 | 0.07 | 200 |
| Example 8 | 100 | Cu—3.2% Ti | — | 0.03 | 0.07 | 200 |
| Example 9 | 115 | Cu—3.2% Ti | — | 0.03 | 0.07 | 170 |
| Example 10 | 115 | Cu—3.2% Ti | — | 0.03 | 0.07 | 170 |
| Example 11 | 115 | Cu—3.2% Ti | — | 0.03 | 0.07 | 170 |
| Example 12 | 115 | Cu—3.2% Ti | — | 0.03 | 0.07 | 170 |
| Example 13 | 115 | Cu—3.2% Ti | — | 0.03 | 0.07 | 170 |
| Example 14 | 115 | Cu—3.2% Ti | — | 0.03 | 0.07 | 170 |
| Example 15 | 115 | Cu—3.2% Ti | — | 0.03 | 0.07 | 170 |
| Example 16 | 115 | Cu—3.2% Ti | — | 0.03 | 0.07 | 170 |
| Example 17 | 130 | Cu—3.2% Ti | — | 0.03 | 0.07 | 130 |
| Example 18 | 130 | Cu—3.2% Ti | — | 0.03 | 0.07 | 130 |
| Example 19 | 130 | Cu—3.2% Ti | — | 0.03 | 0.07 | 130 |
| Example 20 | 130 | Cu—3.2% Ti | — | 0.03 | 0.07 | 130 |
| Example 21 | 130 | Cu—3.2% Ti | — | 0.03 | 0.07 | 130 |
| Example 22 | 130 | Cu—3.2% Ti | — | 0.03 | 0.07 | 130 |
| Example 23 | 130 | Cu—3.2% Ti | — | 0.03 | 0.07 | 130 |
| Example 24 | 130 | Cu—3.2% Ti | — | 0.03 | 0.07 | 130 |
| Example 25 | 145 | Cu—3.2% Ti | — | 0.03 | 0.07 | 100 |
| Example 26 | 145 | Cu—3.2% Ti | — | 0.03 | 0.07 | 100 |
| Example 27 | 145 | Cu—3.2% Ti | — | 0.03 | 0.07 | 100 |
| Example 28 | 145 | Cu—3.2% Ti | — | 0.03 | 0.07 | 100 |
| Example 29 | 145 | Cu—3.2% Ti | — | 0.03 | 0.07 | 100 |
| Example 30 | 145 | Cu—3.2% Ti | — | 0.03 | 0.07 | 100 |
| Example 31 | 145 | Cu—3.2% Ti | — | 0.03 | 0.07 | 100 |
| Example 32 | 145 | Cu—3.2% Ti | — | 0.03 | 0.07 | 100 |
| Example 33 | 100 | Cu—3.2% Ti | — | 0.03 | 0.07 | 200 |
| Example 34 | 100 | Cu—3.2% Ti | — | 0.03 | 0.07 | 200 |
| Example 35 | 100 | Cu—3.2% Ti | — | 0.03 | 0.07 | 200 |
| Example 36 | 100 | Cu—3.2% Ti | — | 0.03 | 0.07 | 200 |
| Example 37 | 100 | Cu—3.2% Ti | — | 0.03 | 0.07 | 200 |
| Example 38 | 100 | Cu—3.2% Ti | — | 0.03 | 0.07 | 200 |
| Example 39 | 100 | Cu—3.2% Ti | — | 0.03 | 0.07 | 200 |
| Example 40 | 100 | Cu—3.2% Ti | — | 0.03 | 0.07 | 200 |
| Example 41 | 115 | Cu—3.2% Ti | — | 0.03 | 0.07 | 170 |
| Example 42 | 115 | Cu—3.2% Ti | — | 0.03 | 0.07 | 170 |
| Example 43 | 115 | Cu—3.2% Ti | — | 0.03 | 0.07 | 170 |
| Example 44 | 115 | Cu—3.2% Ti | — | 0.03 | 0.07 | 170 |
| Example 45 | 115 | Cu—3.2% Ti | — | 0.03 | 0.07 | 170 |
| Example 46 | 115 | Cu—3.2% Ti | — | 0.03 | 0.07 | 170 |

TABLE 1-continued

| | | | | | | | |
|---|---|---|---|---|---|---|---|
| Example 47 | 115 | Cu—3.2% Ti | — | | 0.03 | 0.07 | 170 |
| Example 48 | 115 | Cu—3.2% Ti | — | | 0.03 | 0.07 | 170 |
| Example 49 | 130 | Cu—3.2% Ti | — | | 0.03 | 0.07 | 130 |
| Example 50 | 130 | Cu—3.2% Ti | — | | 0.03 | 0.07 | 130 |
| Example 51 | 130 | Cu—3.2% Ti | — | | 0.03 | 0.07 | 130 |
| Example 52 | 130 | Cu—3.2% Ti | — | | 0.03 | 0.07 | 130 |
| Example 53 | 130 | Cu—3.2% Ti | — | | 0.03 | 0.07 | 130 |
| Example 54 | 130 | Cu—3.2% Ti | — | | 0.03 | 0.07 | 130 |
| Example 55 | 130 | Cu—3.2% Ti | — | | 0.03 | 0.07 | 130 |
| Example 56 | 130 | Cu—3.2% Ti | — | | 0.03 | 0.07 | 130 |
| Example 57 | 145 | Cu—3.2% Ti | — | | 0.03 | 0.07 | 100 |
| Example 58 | 145 | Cu—3.2% Ti | — | | 0.03 | 0.07 | 100 |
| Example 59 | 145 | Cu—3.2% Ti | — | | 0.03 | 0.07 | 100 |
| Example 60 | 145 | Cu—3.2% Ti | — | | 0.03 | 0.07 | 100 |
| Example 61 | 145 | Cu—3.2% Ti | — | | 0.03 | 0.07 | 100 |
| Example 62 | 145 | Cu—3.2% Ti | — | | 0.03 | 0.07 | 100 |
| Example 63 | 145 | Cu—3.2% Ti | — | | 0.03 | 0.07 | 100 |
| Example 64 | 145 | Cu—3.2% Ti | — | | 0.03 | 0.07 | 100 |
| Example 65 | 130 | Cu—3.2% Ti | 0.2% Fe | | 0.03 | 0.07 | 100 |
| Example 66 | 130 | Cu—3.2% Ti | 0.1% Ag—0.1% Co—0.1% Ni | | 0.03 | 0.07 | 100 |
| Example 67 | 130 | Cu—3.2% Ti | 0.05% Si—0.1% Ni—0.1% Zr—0.1% Mg | | 0.03 | 0.07 | 100 |
| Example 68 | 130 | Cu—3.2% Ti | 0.05% P—0.1% Ni—0.05% Mn | | 0.03 | 0.07 | 100 |
| Example 69 | 130 | Cu—3.2% Ti | 0.05%B—0.5% Mo—0.4% Cr | | 0.03 | 0.07 | 100 |
| Example 70 | 130 | Cu—3.2% Ti | 0.2%Fe | | 0.03 | 0.07 | 100 |
| Example 71 | 130 | Cu—3.2% Ti | 0.1% Ag—0.1% Co—0.1% Ni | | 0.03 | 0.07 | 100 |
| Example 72 | 130 | Cu—3.2% Ti | 0.05% Si—0.1% Ni—0.1% Zr—0.1% Mg | | 0.03 | 0.07 | 100 |
| Example 73 | 130 | Cu—3.2% Ti | 0.05% P—0.1% Ni—0.05% Mn | | 0.03 | 0.07 | 100 |
| Example 74 | 130 | Cu—3.2% Ti | 0.05% B—0.05% Mo—0.4% Cr | | 0.03 | 0.07 | 100 |
| Comparative Example 1 | 100 | Cu—3.2% Ti | — | | 0.03 | 0.07 | 200 |
| Comparative Example 2 | 100 | Cu—3.2% Ti | — | | 0.03 | 0.07 | 200 |
| Comparative Example 3 | 100 | Cu—3.2% Ti | — | | 0.03 | 0.07 | 200 |
| Comparative Example 4 | 50 | Cu—3.2% Ti | — | | 0.03 | 0.07 | 250 |
| Comparative Example 5 | 50 | Cu—3.2% Ti | — | | 0.03 | 0.07 | 250 |

| | | | Thickness of Plated Layer (um) | | |
|---|---|---|---|---|---|
| No. | Underlying Plating | Main Plating | Underlying | Main | Reflow |
| Example 1 | Cu | Sn | 0.05 | 0.01 | No |
| Example 2 | Cu | Sn | 0.05 | 0.05 | No |
| Example 3 | Cu | Sn | 0.05 | 0.1 | No |
| Example 4 | Cu | Sn | 0.05 | 0.2 | No |
| Example 5 | Cu | Sn | 0.05 | 0.5 | No |
| Example 6 | Cu | Sn | 0.05 | 1.0 | No |
| Example 7 | Cu | Sn | 0.05 | 1.5 | No |
| Example 8 | Cu | Sn | 0.05 | 2.0 | No |
| Example 9 | Cu | Sn | 0.1 | 0.01 | No |
| Example 10 | Cu | Sn | 0.1 | 0.05 | No |
| Example 11 | Cu | Sn | 0.1 | 0.1 | No |
| Example 12 | Cu | Sn | 0.1 | 0.2 | No |
| Example 13 | Cu | Sn | 0.1 | 0.5 | No |
| Example 14 | Cu | Sn | 0.1 | 1.0 | No |
| Example 15 | Cu | Sn | 0.1 | 1.5 | No |
| Example 16 | Cu | Sn | 0.1 | 2.0 | No |
| Example 17 | Cu | Sn | 0.3 | 0.01 | No |
| Example 18 | Cu | Sn | 0.3 | 0.05 | No |
| Example 19 | Cu | Sn | 0.3 | 0.1 | No |
| Example 20 | Cu | Sn | 0.3 | 0.2 | No |
| Example 21 | Cu | Sn | 0.3 | 0.5 | No |
| Example 22 | Cu | Sn | 0.3 | 1.0 | No |
| Example 23 | Cu | Sn | 0.3 | 1.5 | No |
| Example 24 | Cu | Sn | 0.3 | 2.0 | No |
| Example 25 | Cu | Sn | 0.5 | 0.01 | No |
| Example 26 | Cu | Sn | 0.5 | 0.05 | No |
| Example 27 | Cu | Sn | 0.5 | 0.1 | No |
| Example 28 | Cu | Sn | 0.5 | 0.2 | No |
| Example 29 | Cu | Sn | 0.5 | 0.5 | No |
| Example 30 | Cu | Sn | 0.5 | 1.0 | No |
| Example 31 | Cu | Sn | 0.5 | 1.5 | No |
| Example 32 | Cu | Sn | 0.5 | 2.0 | No |
| Example 33 | Cu | Sn | 0.05 | 0.01 | Yes |
| Example 34 | Cu | Sn | 0.05 | 0.05 | Yes |
| Example 35 | Cu | Sn | 0.05 | 0.1 | Yes |

TABLE 1-continued

| | | | | | |
|---|---|---|---|---|---|
| Example 36 | Cu | Sn | 0.05 | 0.2 | Yes |
| Example 37 | Cu | Sn | 0.05 | 0.5 | Yes |
| Example 38 | Cu | Sn | 0.05 | 1.0 | Yes |
| Example 39 | Cu | Sn | 0.05 | 1.5 | Yes |
| Example 40 | Cu | Sn | 0.05 | 2.0 | Yes |
| Example 41 | Cu | Sn | 0.1 | 0.01 | Yes |
| Example 42 | Cu | Sn | 0.1 | 0.05 | Yes |
| Example 43 | Cu | Sn | 0.1 | 0.1 | Yes |
| Example 44 | Cu | Sn | 0.1 | 0.2 | Yes |
| Example 45 | Cu | Sn | 0.1 | 0.5 | Yes |
| Example 46 | Cu | Sn | 0.1 | 1.0 | Yes |
| Example 47 | Cu | Sn | 0.1 | 1.5 | Yes |
| Example 48 | Cu | Sn | 0.1 | 2.0 | Yes |
| Example 49 | Cu | Sn | 0.3 | 0.01 | Yes |
| Example 50 | Cu | Sn | 0.3 | 0.05 | Yes |
| Example 51 | Cu | Sn | 0.3 | 0.1 | Yes |
| Example 52 | Cu | Sn | 0.3 | 0.2 | Yes |
| Example 53 | Cu | Sn | 0.3 | 0.5 | Yes |
| Example 54 | Cu | Sn | 0.3 | 1.0 | Yes |
| Example 55 | Cu | Sn | 0.3 | 1.5 | Yes |
| Example 56 | Cu | Sn | 0.3 | 2.0 | Yes |
| Example 57 | Cu | Sn | 0.5 | 0.01 | Yes |
| Example 58 | Cu | Sn | 0.5 | 0.05 | Yes |
| Example 59 | Cu | Sn | 0.5 | 0.1 | Yes |
| Example 60 | Cu | Sn | 0.5 | 0.2 | Yes |
| Example 61 | Cu | Sn | 0.5 | 0.5 | Yes |
| Example 62 | Cu | Sn | 0.5 | 1.0 | Yes |
| Example 63 | Cu | Sn | 0.5 | 1.5 | Yes |
| Example 64 | Cu | Sn | 0.5 | 2.0 | Yes |
| Example 65 | Cu | Sn | 0.3 | 0.05 | No |
| Example 66 | Cu | Sn | 0.3 | 0.05 | No |
| Example 67 | Cu | Sn | 0.3 | 0.05 | No |
| Example 68 | Cu | Sn | 0.3 | 0.05 | No |
| Example 69 | Cu | Sn | 0.3 | 0.05 | No |
| Example 70 | Cu | Sn | 0.3 | 0.05 | Yes |
| Example 71 | Cu | Sn | 0.3 | 0.05 | Yes |
| Example 72 | Cu | Sn | 0.3 | 0.05 | Yes |
| Example 73 | Cu | Sn | 0.3 | 0.05 | Yes |
| Example 74 | Cu | Sn | 0.3 | 0.05 | Yes |
| Comparative Example 1 | — | — | — | — | — |
| Comparative Example 2 | — | Ni | — | 0.1 | — |
| Comparative Example 3 | — | Cu | — | 0.1 | — |
| Comparative Example 4 | Cu | Sn | 1.0 | 2.0 | No |
| Comparative Example 5 | | Sn | 1.0 | | Yes |

| | Solider Adhesive Strength (N) | | | Discoloration Resistance | |
|---|---|---|---|---|---|
| No. | Before Heating | After Heating | Etching Linearity | Multiple Environment Test | Gas Corrosion Test |
| Example 1 | 1.2 | ○ | ○ | ○ | ○ |
| Example 2 | 1.3 | ○ | ○ | ⊙ | ○ |
| Example 3 | 1.4 | ○ | ○ | ⊙ | ○ |
| Example 4 | 1.2 | ○ | ○ | ⊙ | ○ |
| Example 5 | 1.3 | ○ | ○ | ⊙ | ○ |
| Example 6 | 1.1 | ○ | ○ | ⊙ | ○ |
| Example 7 | 1.5 | ○ | ○ | ⊙ | ○ |
| Example 8 | 1.7 | ○ | ○ | ⊙ | ○ |
| Example 9 | 3.3 | ○ | ○ | ○ | ○ |
| Example 10 | 3.6 | ○ | ○ | ⊙ | ○ |
| Example 11 | 3.4 | ○ | ○ | ⊙ | ○ |
| Example 12 | 3.5 | ○ | ○ | ⊙ | ○ |
| Example 13 | 2.2 | ○ | ○ | ⊙ | ○ |
| Example 14 | 3.2 | ○ | ○ | ⊙ | ○ |
| Example 15 | 3.6 | ○ | ○ | ⊙ | ○ |
| Example 16 | 3.2 | ○ | ○ | ⊙ | ○ |
| Example 17 | 20.0 | ○ | ○ | ⊙ | ○ |
| Example 18 | 23.2 | ○ | ○ | ⊙ | ○ |
| Example 19 | 24.5 | ○ | ○ | ⊙ | ○ |
| Example 20 | 24.4 | ○ | ○ | ⊙ | ○ |
| Example 21 | 28.0 | ○ | ○ | ⊙ | ○ |
| Example 22 | 24.8 | ○ | ○ | ⊙ | ○ |

TABLE 1-continued

| | | | | | |
|---|---|---|---|---|---|
| Example 23 | 22.0 | ○ | ○ | ⊚ | ○ |
| Example 24 | 25.0 | ○ | ○ | ⊚ | ○ |
| Example 25 | 33.2 | ○ | ○ | ○ | ○ |
| Example 26 | 32.4 | ○ | ○ | ⊚ | ○ |
| Example 27 | 30.1 | ○ | ○ | ⊚ | ○ |
| Example 28 | 32.4 | ○ | ○ | ⊚ | ○ |
| Example 29 | 32.5 | ○ | ○ | ⊚ | ○ |
| Example 30 | 33.5 | ○ | ○ | ⊚ | ○ |
| Example 31 | 35.0 | ○ | ○ | ⊚ | ○ |
| Example 32 | 33.6 | ○ | ○ | ⊚ | ○ |
| Example 33 | 1.0 | ○ | ○ | ○ | ○ |
| Example 34 | 1.1 | ○ | ○ | ⊚ | ○ |
| Example 35 | 1.3 | ○ | ○ | ⊚ | ○ |
| Example 36 | 1.4 | ○ | ○ | ⊚ | ○ |
| Example 37 | 1.2 | ○ | ○ | ⊚ | ○ |
| Example 38 | 1.3 | ○ | ○ | ⊚ | ○ |
| Example 39 | 1.4 | ○ | ○ | ⊚ | ○ |
| Example 40 | 1.8 | ○ | ○ | ⊚ | ○ |
| Example 41 | 3.8 | ○ | ○ | ○ | ○ |
| Example 42 | 4.0 | ○ | ○ | ⊚ | ○ |
| Example 43 | 3.8 | ○ | ○ | ⊚ | ○ |
| Example 44 | 3.6 | ○ | ○ | ⊚ | ○ |
| Example 45 | 5.2 | ○ | ○ | ⊚ | ○ |
| Example 46 | 7.2 | ○ | ○ | ⊚ | ○ |
| Example 47 | 7.8 | ○ | ○ | ⊚ | ○ |
| Example 48 | 7.5 | ○ | ○ | ⊚ | ○ |
| Example 49 | 31.0 | ○ | ○ | ○ | ○ |
| Example 50 | 31.4 | ○ | ○ | ⊚ | ○ |
| Example 51 | 32.0 | ○ | ○ | ⊚ | ○ |
| Example 52 | 32.2 | ○ | ○ | ⊚ | ○ |
| Example 53 | 32.2 | ○ | ○ | ⊚ | ○ |
| Example 54 | 31.9 | ○ | ○ | ⊚ | ○ |
| Example 55 | 33.0 | ○ | ○ | ⊚ | ○ |
| Example 56 | 32.6 | ○ | ○ | ⊚ | ○ |
| Example 57 | 32.0 | ○ | ○ | ⊚ | ○ |
| Example 58 | 31.4 | ○ | ○ | ⊚ | ○ |
| Example 59 | 32.8 | ○ | ○ | ⊚ | ○ |
| Example 60 | 33.5 | ○ | ○ | ⊚ | ○ |
| Example 61 | 33.9 | ○ | ○ | ⊚ | ○ |
| Example 62 | 33.4 | ○ | ○ | ⊚ | ○ |
| Example 63 | 34.0 | ○ | ○ | ⊚ | ○ |
| Example 64 | 34.3 | ○ | ○ | ⊚ | ○ |
| Example 65 | 30.2 | ○ | ○ | ⊚ | ○ |
| Example 66 | 30.5 | ○ | ○ | ⊚ | ○ |
| Example 67 | 30.3 | ○ | ○ | ⊚ | ○ |
| Example 68 | 31.1 | ○ | ○ | ⊚ | ○ |
| Example 69 | 32.8 | ○ | ○ | ⊚ | ○ |
| Example 70 | 29.8 | ○ | ○ | ⊚ | ○ |
| Example 71 | 30.7 | ○ | ○ | ⊚ | ○ |
| Example 72 | 29.9 | ○ | ○ | ⊚ | ○ |
| Example 73 | 31.0 | ○ | ○ | ⊚ | ○ |
| Example 74 | 32.7 | ○ | ○ | ⊚ | ○ |
| Comparative Example 1 | 0.4 | X | ○ | X | X |
| Comparative Example 2 | 12.2 | ○ | X | ⊚ | ○ |
| Comparative Example 3 | 27.7 | ○ | ○ | ⊚ | X |
| Comparative Example 4 | 0.3 | X | ○ | ⊚ | ○ |
| Comparative Example 5 | 0.2 | X | ○ | ⊚ | ○ |

DESCRIPTION OF REFERENCE NUMERALS

1 auto focus camera module
2 york
3 lens
4 magnet
5 carrier
6 coil
7 base
8 frame
9a upper spring member
9b lower spring member
10a, 10b cap

What is claimed is:

1. A titanium copper foil comprising a base metal, the base metal having a composition containing Ti of from 1.5% by mass to 5.0% by mass, optionally containing one or more additional elements selected from the group consisting of Ag, B, Co, Fe, Mg, Mn, Mo, Ni, P, Si, Cr, and Zr in a total content of said one or more additional elements of from 0% by mass to 1.0% by mass, the balance being copper and inevitable impurities, and the base metal having a thickness of from 0.018 mm to 0.1 mm, wherein the titanium copper foil has a plated layer in which an underlying Cu plated layer and an Sn plated layer have been laminated in this order on a surface of the base metal, and has an adhesive strength of 1 N or more as measured by a solder adhesive strength test according to a procedure wherein:
- a titanium copper foil having a plated layer and a pure copper foil (alloy number C1100 as defined in JIS H3100-2012; foil thickness of 0.02 mm to 0.05 mm) are joined together via a lead-free solder (Sn-3.0% by mass, Ag-0.5% by mass Cu);
- the titanium copper foil is in the form of a rectangle having a width of 15 mm and a length of 200 mm, and the pure copper foil is in the form of a rectangle having a width of 20 mm and a length of 200 mm;
- the lead-free solder (diameter: 0.4±0.02 mm, length 120±1 mm) is arranged in an area of 30 mm×15 mm at a central portion in a lengthwise direction so as to fall within the above-mentioned area, and joined at a joining temperature of 245° C.±5° C.; and,
- after joining, a solder adhesive strength is measured by performing a 180° peeling test at a speed of 100 mm/min, wherein an average value of a load (N) in the section of 40 mm from 30 mm to 70 mm of peeling displacement is defined as the adhesive strength.

2. The titanium copper foil according to claim 1, wherein the underlying Cu plated layer has a thickness of from 0.01 µm to 2.0 µm.

3. The titanium copper foil according to claim 1, wherein the Sn plated layer has a thickness of from 0.01 µm to 2.0 µm.

4. The titanium copper foil according to claim 1, wherein the base metal further contains one or more additional elements selected from the group consisting of Ag, B, Co, Fe, Mg, Mn, Mo, Ni, P, Si, Cr, and Zr in a total content of said one or more additional elements of from 0% by mass to 1.0% by mass.

5. The titanium copper foil according to claim 1, wherein the titanium copper foil has a tensile strength in a direction parallel to a rolling direction of 1100 MPa or more.

6. The titanium copper foil according to claim 1, wherein the adhesive strength is 20 N or more.

7. The titanium copper foil according to claim 1, wherein a decreasing rate of the adhesive strength after heating at a temperature of 85° C. for 100 hours relative to the adhesive strength before the heating is less than 5%.

8. The titanium copper foil according to claim 1, wherein the titanium copper foil is processed by etching.

9. An electronic component comprising the titanium copper foil according to claim 1.

10. A joined body of the titanium copper foil according to claim 1 and a solder, wherein the joined body has a joined site to the solder on a surface of the plated layer of the titanium copper foil.

11. A method for joining the titanium copper foil according to claim 1 to a conductive member, comprising shape processing the titanium copper foil by etching; and joining the resulting profiled product of the titanium copper foil to the conductive member at a location having the plated layer by soldering.

12. An autofocus module comprising the titanium copper foil according to claim 1 as a spring material.

13. An autofocusing camera module comprising a lens; a spring member made of the titanium copper foil according to claim 1 for elastically biasing the lens to an initial position in an optical axis direction; and an electromagnetic driving means configured to generate electromagnetic force for withstanding the biasing force of the spring member so that the lens can be driven in the optical axis direction, wherein the electromagnetic driving means comprises a coil, and wherein the spring member is joined to the coil at a location having the plated layer by soldering.

14. A method for producing a titanium copper foil, comprising:
- preparing a base metal having a composition containing Ti of from 1.5% by mass to 5.0% by mass, optionally containing one or more elements selected from the group consisting of Ag, B, Co, Fe, Mg, Mn, Mo, Ni, P, Si, Cr, and Zr in a total amount content of said one or more additional elements of from 0% by mass to 1.0% by mass, the balance being copper and inevitable impurities, wherein the base metal has a thickness of from 0.018 mm to 0.1 mm, and has a surface glossiness of from 100 to 200; and
- laminating an underlying Cu plated layer and an Sn plated layer in this order on a surface of the base metal to produce the titanium copper foil, wherein the titanium copper foil has an adhesive strength of 1 N or more as measured by a solder adhesive strength test according to a procedure wherein:
- a titanium copper foil having a plated layer and a pure copper foil (alloy number C1100 as defined in JIS H3100-2012; foil thickness of 0.02 mm to 0.05 mm) are joined together via a lead-free solder (Sn-3.0% by mass, Ag-0.5% by mass Cu);
- the titanium copper foil is in the form of a rectangle having a width of 15 mm and a length of 200 mm, and the pure copper foil is in the form of a rectangle having a width of 20 mm and a length of 200 mm;
- the lead-free solder (diameter: 0.4±0.02 mm, length 120±1 mm) is arranged in an area of 30 mm×15 mm at a central portion in a lengthwise direction so as to fall within the above-mentioned area, and joined at a joining temperature of 245° C.±5° C.; and,
- after joining, a solder adhesive strength is measured by performing a 180° peeling test at a speed of 100 mm/min, wherein an average value of a load (N) in the section of 40 mm from 30 mm to 70 mm of peeling displacement is defined as the adhesive strength.

15. The method for producing the titanium copper foil according to claim 14, wherein the underlying Cu plated layer has a thickness of from 0.01 µm to 2.0 µm.

16. The method for producing the titanium copper foil according to claim 14, wherein the Sn plated layer has a thickness of from 0.01 µm to 2.0 µm.

17. The method for producing the titanium copper foil according to claim 14, wherein the base metal further contains one or more elements selected from the group consisting of Ag, B, Co, Fe, Mg, Mn, Mo, Ni, P, Si, Cr, and Zr in a total amount of 0% by mass to 1.0% by mass.

18. The method for producing the titanium copper foil according to claim 14, wherein the surface of the base metal having the surface glossiness of from 100 to 200 has arithmetic average roughness (Ra) of 0.5 µm or less.

* * * * *